United States Patent
Autechaud et al.

[15] 3,697,022
[45] Oct. 10, 1972

[54] METHOD AND APPARATUS FOR AIRCRAFT GUIDANCE

[72] Inventors: Denis Autechaud, Paris; Jean-Claude Grisard, Boulogne Billancourt, both of France

[73] Assignee: Societe De Fabrication D'Instruments De Mesure (SFIM)

[22] Filed: July 6, 1970

[21] Appl. No.: 52,388

[52] U.S. Cl. .............244/17.13, 244/77 A, 340/27 R, 343/107, 343/108 R
[51] Int. Cl. .............................................B64c 13/50
[58] Field of Search.........343/108 R, 107; 244/77 A, 17.13, 244/17.11, 114 R; 340/27 R, 22, 24, 26

[56] References Cited

UNITED STATES PATENTS

| | | | |
|---|---|---|---|
| 2,845,623 | 7/1958 | Iddings | 343/108 R X |
| 2,869,804 | 1/1959 | Muinch et al. | 343/108 R X |
| 2,932,023 | 4/1960 | Haskins | 343/108 R X |
| 3,058,699 | 10/1962 | Osder | 343/108 R X |
| 3,195,135 | 7/1965 | Fleuchaus | 343/108 R |
| 3,266,753 | 8/1966 | Gaylor | 343/108 R X |

*Primary Examiner*—Milton Buchler
*Assistant Examiner*—Paul E. Sauberer
*Attorney*—Christie, Parker & Hale

[57] ABSTRACT

A method of guiding aircraft to effect an automatic approach to a landing place in which radar waves are transmitted to be received by the flight controls of the aircraft. The radar waves are transmitted from the ground at a carrier frequency of the order of gigahertz and define a radioelectric guiding axis situated at the intersection of a vertical radioelectric plane of alignment and a radioelectric descent plane perpendicular to the vertical plane and inclined to the horizontal. The method is particularly suitable for use with helicopters. Apparatus for carrying out the method includes a transmitter on the ground for transmitting radar waves of very short wavelength and equipment on board the helicopter comprising a receiver for the radar waves connected by a coupler to an automatic pilot of the helicopter flight controls.

20 Claims, 3 Drawing Figures

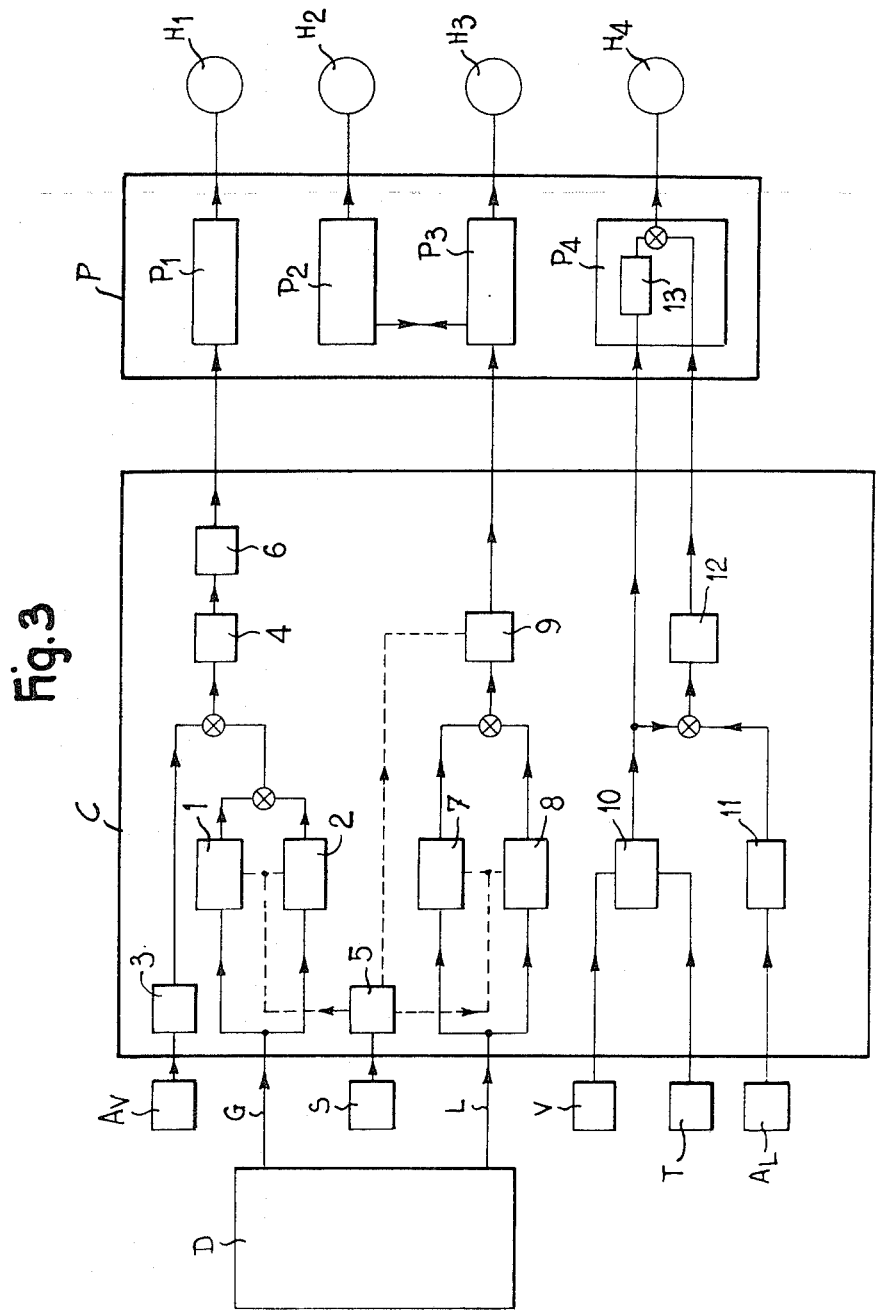

METHOD AND APPARATUS FOR AIRCRAFT GUIDANCE

BACKGROUND OF THE INVENTION

Various processes and apparatus for guiding an airplane with a view to effecting the automatic approach to a landing place are already known. These processes, in particular the ones known as "I.L.S." (Instrument Landing System), are unsuitable for guiding a helicopter because of the different approach conditions for airplanes and helicopters. The present invention seeks to provide a new process and a new apparatus particularly suitable for guiding an aircraft such as a helicopter.

SUMMARY OF THE INVENTION

The present invention therefore provides a method of guiding an aircraft to effect an automatic approach to a landing place, comprising the steps of transmitting from the ground UHF or SHF waves at a carrier frequency of the order of gigahertz in such a way as to define a vertical radioelectric plane of alignment, a radioelectric descent plane perpendicular to and intersecting the said vertical plane and inclined to the horizontal, and a radioelectric guiding axis situated at the intersection of the said vertical plane and the said descent plane; and receiving the said radar waves by means of receiving equipment located on board the said aircraft, the said receiving equipment being adapted to cause actuation of flight controls of the aircraft.

BRIEF DESCRIPTION OF THE DRAWINGS

FIG. 3 is a circuit diagram of apparatus on board the helicopter for guiding its flight.

DETAILED DESCRIPTION OF THE INVENTION

A transmitter E on the ground emits radio waves of a carrier frequency of 15.5 ghz which define a radioelectric guide axis R situated at the intersection of a vertical radioelectric plane of alignment and a radioelectric plane of descent perpendicular to the vertical plane and inclined to the horizontal. These waves are received on board the helicopter and used to act on the flight controls of the helicopter.

Figure 1:
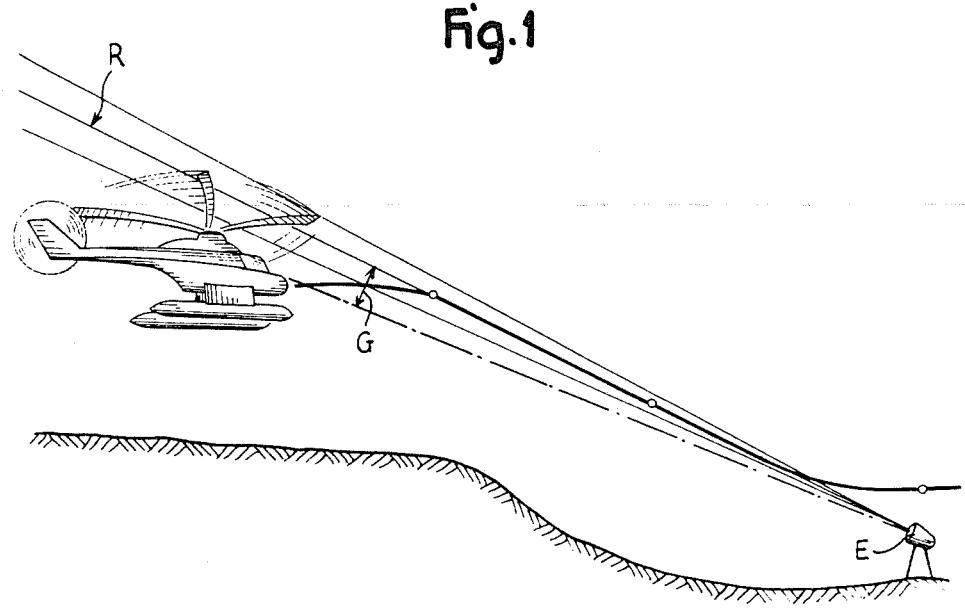
FIG. 1 is an elevational view of a helicopter in its approach flight.
Figure 2:
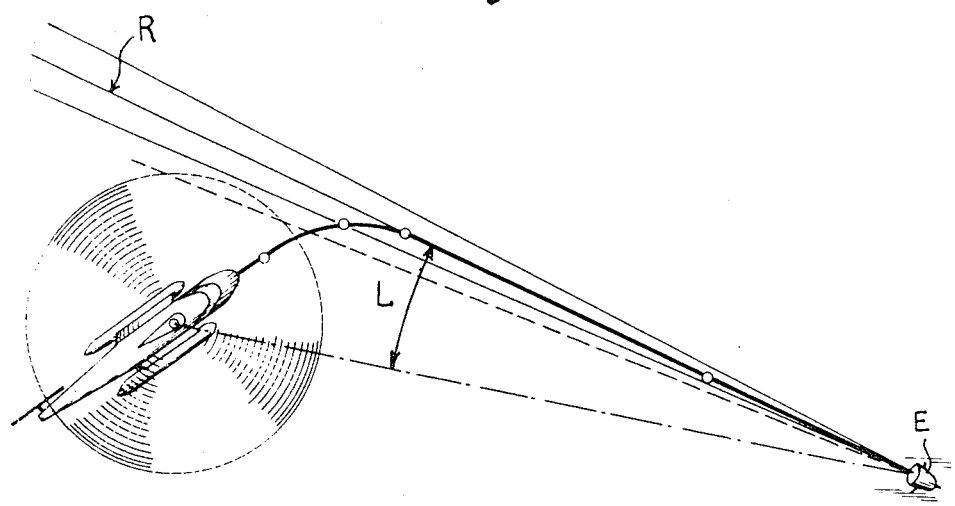
FIG. 2 is a top view of the helicopter in its approach flight.

On board the helicopter, the received waves are used to form an electrical signal of vertical deviation G representing the vertical angular deviation of the helicopter from the plane of descent (FIG. 1), to form a differentiated signal $dG/dt$ proportional to the differential coefficient with respect to time of the said vertical deviation signal, and to form therefrom a correcting signal comprising a damping term $K(dG/dt)$ proportional to the said differentiated signal. This correcting signal is caused to act on the collective pitch control of the helicopter in order to obtain the appropriate change in vertical velocity.

Furthermore, the distance of the helicopter from the transmitter is worked out on board the helicopter and the results of this calculation is used to decrease the said damping term when the said distance diminishes.

In one embodiment, the said distance is worked out by an altitude information by means of radiosondes.

It is also possible to detect on board the helicopter the vertical acceleration of the helicopter and to use the result of this detection to produce a signal $K_3 v_z$ which represents the vertical velocity of the helicopter and which is introduced as damping term in the said correcting signal. In addition, the maximum value of the correcting signal can be limited for flight safety.

The correcting signal is only brought into play when the helicopter has reached the inclined descent plane as explained hereafter. In order to carry this out on board the helicopter, equipment is provided comprising a radar wave receiver D connected by a coupler C to an automatic pilot P of the helicopter (FIG. 3).

The receiver supplies to the coupler (see C) a signal G which represents the vertical angular deviation (glide signal), and the coupler C comprises an assembly of means for producing from this signal an electric correcting signal of the collective helicopter pitch.

This correcting signal comprises a principal term $K_1 G$ proportional to the vertical angular deviation of the helicopter from the plane of alignment, the damping term $K_2(dG/dt)$ proportional to the differential coefficient with respect to time of this deviation, and the damping term $K_3 v_z$ proportional to the vertical velocity of the helicopter.

These means may comprise, for example, an amplifier device 1 which receives the signal G and forms a signal $K_1 G$, a differentiating and amplifying device 2 which receives the signal C and forms an amplified differentiated signal $K_2(dG/dt)$, an integrating device 3 which forms the signal $K_3 v_z$ from a signal received from a vertical accelerometer Av. The signal $K_3 v_z$ is added to the two signals $K_1 G$ and $K_2(dG/dt)$, and the resultant signal is then passed into a limiting device 4.

The gains $K_1$ and $K_2$ of the amplifiers 1 and 2 are under the control of a device 5 which receives an altitude signal from a radiosonde S and which causes the gains to decrease in proportion to the altitude loss in accordance with this signal.

The altitude signal is used solely as an easily obtained representation of the distance of the helicopter from the radar transmitter, and it could obviously be replaced by any signal effectively giving this distance.

The object of the limiting device is to limit the amplitude of the correcting signal to a maximum value compatible with flight safety.

The correcting signal $K_1 G + K_2(dG/dt) + K_3 v_z$ is transmitted to the input of an altitude system $P_1$ of the automatic pilot which acts in accordance with this signal on a general pitch control $H_1$ of the helicopter.

Transmission of the correcting signal to the input of the altitude system is under the control of a threshold gate 6 which only lets the signal pass when the helicopter in vertical flight has reached the inclined plane of descent. When this correcting signal becomes less than a minimum threshold value, which indicates the helicopter has reached the inclined plane of descent, gate 6 transmits the correcting signal to altitude system $P_1$. Otherwise, the correcting signal is not transmitted to altitude system $P_1$.

The radar transmission received on board the helicopter is also used to form an electric lateral deviation signal which represents the horizontal angular deviation of the helicopter from the plane of alignment, and from which there are formed a derivative signal proportional to the differential coefficient with respect to time of the said lateral deviation signal and a rolling correcting signal which comprises a damping term proportional to the said derivative signal. This correcting signal is caused to act on the attitude control of the helicopter so as to bring the helicopter into the plane of vertical alignment and keep it there.

In order to achieve this, the receiver D supplies to the coupler C an electrical signal L (localizer signal) which represents the horizontal angular deviation. The coupler C comprises an amplifier device 7 which receives this signal and transforms it into an amplified signal $K_4L$, a differentiating and amplifying device 8 which receives the signal L and transforms it into an amplified differentiated signal $K_5(dL/dt)$, and a limiting device 9 which limits the maximum value of a correcting signal constituted by the sum of the signals $K_4L$ and $K_2(dL/Adt)$.

The gains $K_4$ and $K_5$ are preferably also made to decrease with the distance of the helicopter from the emitter in response to device 5, and the limiting device 9 is so designed as to lower the value of the maximum limit in response to device 5 when the altitude has decreased below a chosen threshold. In other words, limiting device 9 has two thresholds, the operative one of which is selected by device 5.

For example, the amplitude of the correcting signal can be at first limited to a value such that the variation in angle of roll controlled by this signal does not exceed 15° above a certain altitude and then to a value such that this variation does not exceed 6° below such altitude.

This correcting signal is transmitted to the input of a rolling system $P_2$ of the automatic pilot and this system acts on the control $H_2$ of the angle of roll of the helicopter so as to keep the aircraft in the vertical plane of alignment.

A course rotation carried out at a speed of rotation such that the turn is made without side slipping is arranged to correspond to the angle of roll.

For this purpose, the automatic pilot comprises a yawing system $P_3$ and coupling means between this system and the rolling system $P_2$ such that the variation in angle of roll corresponds to an operation of the course control $H_3$.

The coupler also comprises means for producing an electrical correcting signal to correct the attitude of pitching. This correcting signal comprises a principal term $K_6(Vi-Vc)$ proportional to the difference between the indicated air speed Vi of the helicopter and its control speed Vc, and a damping term $K_7(dVi/dt)$ proportional to the differential coefficient with respect to time of the longitudinal velocity of the helicopter.

The means for producing this signal comprises a comparator 10 which receives an air speed signal from an anemometer V and a velocity control signal from an apparatus T, and which provides a comparison signal $K_6(Vi-Vc)$. The comparison signal is added to a signal $K_7(dv_l dt)$ formed in a device 11 from a longitudinal acceleration signal provided by a longitudinal accelerometer $A_L$, so as to constitute a correcting signal which after passing through a maximum limiting device is transmitted to the input of a pitching system $P_4$ of the automatic pilot.

This pitching system consequently acts on the depth control $H_4$ of the helicopter so as to correct the pitching attitude as required.

In one particular embodiment of the invention, this pitching system comprises an integrating device 13 which also receives the differential signal $K(Vi-Vc)$ from device 10 and which forms an integrated signal proportional to the integral of the differential signal and which is added to the correcting signal for correcting the pitching attitude.

We claim:

1. A method of guiding an aircraft, of the type having a general power control for altitude command, and a direction control for roll and yaw command, to effect an automatic approach to a landing place, comprising:

transmitting from the ground directional radio waves at a carrier frequency of the order of gigahertz defining a radio electric guiding axis comprising a vertical localizer plane and a glide plane perpendicular to the localizer plane;

receiving said waves on board the aircraft and deriving therefrom a glide signal representing the vertical angular deviation of the aircraft from the glide plane and a localizer signal representing the horizontal angular deviation of the aircraft from the localizer plane;

forming a differentiated glide signal proportional to the differential of said glide signal and a differentiated localizer signal proportional to the differential of said localizer signal;

forming an altitude correcting signal comprising the sum of said glide signal and said differential glide signal and a direction correcting signal comprising the sum of said localizer signal and said differential localizer signal; and applying said altitude correcting signal and said direction correcting signal to the general power control and to the direction control of the aircraft respectively.

2. Method according to claim 1, wherein a quantity is sensed representing the distance of the aircraft to the transmitter and wherein the proportionality coefficient of at least one of said differential glide signal and differential localizer signal is decreased in accordance with the decreasing of said quantity.

3. Method according to claim 2, wherein said quantity is an altitude information.

4. Method according to claim 1, wherein vertical acceleration of the aircraft is detected on board, a vertical velocity signal is formed proportional to the differential of said vertical acceleration, and said vertical velocity signal is added in the sum to form said altitude correcting signal.

5. Method according to claim 1, for an aircraft having a speed control apparatus and a depth control, wherein the air speed of the aircraft is detected on board thereof, a speed difference signal is formed proportional to the difference between the air speed and the control speed, and a pitching attitude signal comprising said speed difference signal is applied to said depth control so as to eliminate said difference.

6. Method according to claim 5, wherein longitudinal acceleration of the aircraft is detected on board thereof, the result of this detection is used to form a signal proportional to the differential coefficient with respect to time of the longitudinal velocity, and this proportional signal is introduced as a term in the said pitching attitude signal.

7. Method according to claim 5, wherein the maximum value of the said pitching attitude signal is limited.

8. Method according to claim 5, wherein an integral signal proportional to the integral of the said difference signal is formed and in which this integral signal is used also to act upon the depth control.

9. Method according to claim 1, wherein the maximum value of the said direction correcting signal is limited and in which the value of the limit is lowered in the course of the approach to maintain it at a value commensurate with flight safety.

10. Method according to claim 9, wherein a course rotation is carried out responsive to the roll correcting signal at a speed of rotation such that the turn is effected without side slipping.

11. Method according to claim 1 wherein the maximum value of the said altitude correcting signal is limited to a value commensurate with flight safety.

12. Method according to claim 1 wherein the altitude correcting signal is brought into operation only after the aircraft has reached the inclined plane of descent.

13. Method according to claim 1, wherein the aircraft is a helicopter.

14. Apparatus for guiding an aircraft to effect an automatic approach to a landing place, the aircraft having a general power control for altitude command and a direction control for a roll and yaw command, the apparatus comprising:
   means for transmitting from the ground toward the aircraft directional radio waves at a carrier frequency of the order of gigahertz defining a radioelectric guiding axis comprising a vertical localizer plane and a glide plane perpendicular to the localizer plane;
   means for receiving said radio waves on board the aircraft;
   means responsive to the received radio waves for producing a first signal representing the vertical angular deviation of the aircraft from the glide plane;
   means responsive to the received radio waves for producing a second signal representing the horizontal angular deviation of the aircraft from the localizer plane;
   means responsive to the first signal for producing a third signal representing the differential of the vertical angular deviation;
   means responsive to the second signal for producing a fourth signal representing the differential of the horizontal angular deviation;
   means responsive to the first and third signals for operating the general power control for altitude command to reduce the vertical angular deviation; and
   means responsive to the second and fourth signals for operating the direction control to reduce the horizontal angular deviation.

15. The apparatus of claim 14, additionally comprising means for attenuating the first and third signals as the aircraft approaches the transmitting means.

16. The apparatus of claim 14, additionally comprising means for preventing the operation of the general power control responsive to the first and third signals before the aircraft reaches the guiding axis.

17. The apparatus of claim 14, in which the direction control comprises a rolling system and a yawing system, the second and fourth signals are applied to the rolling system, and the second and fourth signals are applied to the yawing system such that a course rotation is carried out at the speed of rotation without side slipping.

18. The apparatus of claim 14, additionally comprising:
   means for producing a fifth signal representative of the difference between the anemometric speed of the aircraft and a control speed;
   means for producing a sixth signal representative of the differential coefficient with respect to time of the longitudinal velocity of the aircraft; and
   means responsive to the fifth and sixth signals for correcting the pitch of the aircraft to reduce the difference between the anemometric speed and the control speed.

19. The apparatus of claim 18, additionally comprising means for producing a seventh signal representative of the integral of the fifth signal, the pitch correcting means being responsive to the seventh signal.

20. The apparatus of claim 14, in which the aircraft is a helicopter.

* * * * *